United States Patent [19]
Bell

[11] Patent Number: 5,284,692
[45] Date of Patent: Feb. 8, 1994

[54] ELECTROSTATIC EVACUATED INSULATING SHEET

[76] Inventor: Dennis J. Bell, Los Altos, Calif.

[21] Appl. No.: 782,302

[22] Filed: Oct. 24, 1991

[51] Int. Cl.⁵ .......................... B32B 3/12; E04B 1/74
[52] U.S. Cl. ................................. 428/69; 29/631.1;
52/306; 52/307; 52/308; 52/407; 307/400;
428/68; 428/76; 428/220; 428/457
[58] Field of Search ............. 428/69, 76, 68, 220,
428/457; 307/400; 29/631.1; 52/306, 307, 308,
407, DIG. 4

[56] References Cited

U.S. PATENT DOCUMENTS

| | | | |
|---|---|---|---|
| 1,984,007 | 12/1934 | Babbitt | 189/34 |
| 3,769,770 | 11/1973 | Deschamps et al. | 52/404 |
| 3,936,553 | 2/1976 | Rowe | 428/81 |
| 4,317,854 | 3/1982 | Rathmell | 428/182 |
| 4,390,800 | 6/1983 | Tanaka et al. | 307/400 |
| 4,420,922 | 12/1983 | Wilson | 52/791 |
| 4,440,591 | 4/1984 | Pook | 428/76 |
| 4,468,423 | 8/1984 | Hall | 428/72 |
| 4,527,218 | 7/1985 | von Seggern | 361/233 |
| 4,626,263 | 12/1986 | Inoue et al. | 55/155 |
| 4,654,546 | 7/1987 | Kirjavainen | 307/400 |
| 4,669,632 | 6/1987 | Kawasaki | 428/69 |
| 4,791,773 | 12/1988 | Taylor | 52/790 |

FOREIGN PATENT DOCUMENTS

727775 4/1980 U.S.S.R. .

Primary Examiner—Ellis P. Robinson
Assistant Examiner—Nasser Ahmad

[57] ABSTRACT

An electrostatic evacuated insulating sheet comprises two permanently charged electret repulsion layers (18 and 28) laminated to two respective insulating layers (16 and 26), which are in turn laminated to two impermeable metallic compensation layers (14 and 24). The foregoing laminate is then covered by two protective layers (12 and 22). The repulsion layers (18 and 28) are sufficiently charged with monopolar electric charges so that, by Coulomb force, a small (1 to 20 micron) evacuated space is established and maintained between the repulsion layers. This space is sufficient to stop all heat transfer through the sheet by convection or conduction. The resulting vacuum insulated sheet is very thin (1.2 mm to 2.9 mm) and flexible. It provides an greatly improved insulating performance over any previous flexible sheet insulation, equivalent to at least 170 mm of polystyrene foam.

24 Claims, 5 Drawing Sheets

ELECTROSTATIC EVACUATED INSULATING SHEET

BACKGROUND—FIELD OF INVENTION

This invention relates to sheets or panel structures having internal evacuated cavities, specifically to sheets of this type which are used to provide vacuum thermal insulation and which are kept separate by a novel arrangement.

BACKGROUND—DESCRIPTION OF PRIOR ART

There are many applications for insulation that is thin in comparison to its width and length, that is, an insulating sheet or panel. It is well known that removing all air inside a panel or other structure to a high vacuum greatly increases its insulating ability, since vacuum does not allow heat transfer by convection or conduction. (Here a high vacuum is defined as one having a pressure less than 0.1 Newton per square meter—approximately one millionth of normal atmospheric pressure.) All prior-art evacuated panel structures required internal members to resist the external collapsing forces due to ambient atmospheric pressure. These members supported the compressive stresses between the panel walls. Without these members, the two external walls would collapse together and touch, establishing a path of high thermal conductivity that would defeat the insulating capability of the panel.

Prior-art internal compression members have generally provided conductive heat paths which substantially reduce the panel's insulating ability. To limit such losses, prior-art designs have taken several approaches. The first approach limits the cross-sectional area of heat flow paths in the internal members, or spacers. In U.S. Pat. No. 1,984,007 (1934), Babbitt provides multiple internal spacers, acting as compression members, with point contacts on the external walls. Point contacts between multiple internal spacers are also disclosed in U.S. Pat. No. 4,420,922 (1983) to Wilson. Babbitt's and Wilson's spacers have substantial structure in the non-point-contact areas, providing significant paths for heat. In U.S. Pat. No. 4,791,773 (1988), Taylor discloses undulating ribbon-like internal spacers. While Taylor's spacers have less structure than those of Babbitt or Wilson, their edges have relatively large areas of contact with the panel's walls, substantially increasing the path for heat. In U.S. Pat. No. 3,769,770 (1973), Deschamps et al. (Deschamps) use a multiplicity of small, hard spheres in point contact. But, the insulator panel of Deschamps is relatively thick—2.86 cm (1.125")—precluding its use in any applications where a thin insulation sheet is required.

Another approach to limiting the heat loss of internal compression members is to use low conductivity material in the spacers Rowe, in U.S. Pat. No. 3,936,553 (1976), uses spacer pins made of glass fiber filled with epoxy. Deschamps use spherical spacers made of inorganic materials, such as quartz or alumina. Kawasaki et al., in U.S. Pat. No. 4,669,632 (1987), describe an evacuated insulating panel having two gas impermeable films sealed at their peripheries to form a bag and a heat insulating core material charged into the bag, acting as a spacer. The heat insulating core material may include: perlite, silica, diatomaceous earth, calcium silicate, asbestos, or foamed plastic material. Yet even such low conductivity spacer materials as taught by Rowe, Deschamps, and Kawasaki et al. still allow substantial heat flow through the panel, which can be limited only by substantially increasing the insulating sheet's thickness and inflexibility.

Yet another approach to limiting the heat loss of internal compression members is to provide for a longer heat path in the internal members. Hall, in U.S. Pat. No. 4,468,423 (1984), discloses a plurality of insulating cells which, when stacked, provide labyrinthal paths for heat flow between the cells acting as internal spacers. Rathmell, in U.S. Pat. No. 4,317,854 (1982), discloses a web tension member acting as an internal spacer. The web member increases the distance of the heat flow path since it is a relatively long component which is parallel to the sheets. Also, it has a narrow cross sectional area which further retards heat transfer. However, the designs of Hall and Rathmell increase the thickness of the panel to gain increased insulating effectiveness, precluding the use of such panels when a thin insulating panel is required.

Dakhin et al. (Dakhin), in U.S.S.R. patent 727,775 (1980) now U.S. Pat. No. 5,111,616, describes an evacuated panel structure having two walls, each with attached internal magnets to create forces acting to oppose the collapsing forces. The magnets may be permanent magnets, electromagnets, or electrostatic plates. The magnets perform the function of internal spacers, but without physical contact between the magnets from opposite walls. Such a panel has no structural path in the panel's interior for heat conduction, so there is no heat loss through the middle of the panel. However, the magnets are heavy and bulky, requiring Dakhin's panel to be thick so as to preclude use when a light or thin insulator is required. Also, all permanent magnetic materials loose their magnetism when subject to a temperature over that material's Curie temperature, limiting the applications for those insulators. Use of electrostatic plates instead of magnets will not produce sufficient force in atmosphere to resist collapse of the evacuated space in the configurations shown by Dakhin, without the additional use of thick and heavy walls and edge spacers.

My copending U.S. patent application Ser. No. 07/734,307, filed Jul. 19, 1991, describes a flexible evacuated insulating panel with either a web tension member or a high-porosity material acting as internal spacers. While flexible, the resulting panels require increased thickness to gain increased insulating effectiveness.

In summary, prior-art evacuated panels or sheet insulators have the following disadvantages:

(a) Evacuated panels using internal members to resist collapse have reduced insulating capability due to heat conduction via such members.

(b) Evacuated panels using permanent magnets as internal spacers are not useful at temperatures exceeding the Curie temperature for that magnetic material.

(c) All previous evacuated panels have been relatively heavy, due to the substantial structure needed in internal spacers (or magnets) and walls to resist collapse, precluding their use in applications requiring light weight.

(d) All previous evacuated panels have been relatively thick, to reduce heat loss through internal spacers (or to provide space for magnets), precluding their use in applications requiring a thin sheet insulator.

(e) All previous evacuated panel structures have been rigid, or flexible to only a limited degree with a relatively large bending radius, precluding their use in applications for sheets requiring sharp bending radii or requiring easy flexure during application or use.

In another prior-art area, Kirjavainen, in U.S. Pat. No. 4,654,546 (1987), discloses an electrostatic film for converting electrostatic energy into useful mechanical work. Kirjavainen shows a dielectric film having many internal cells and coated on one or both sides with an electrically conductive layer. This film, in a typical thickness of 10 micrometers (microns), produces electrostatic forces equal to sea-level atmospheric pressure of 100,000 Newtons/meter squared ($N/m^2$) when driven by a voltage of 1 kiloVolt (kV). Kirjavainen points out that electrostatic forces in a panel are directly proportional to the second power of the voltage and, more importantly, inversely proportional to the second power of the thickness. By using a very thin film, only 10 microns, he is able to provide very high forces with only modest voltages.

Kirjavainen's film is not useful for evacuated insulating panel applications. He does not show any method for establishing or maintaining an evacuated layer in the film. For example, no gas-impermeable layer is shown and no edge seal is shown. His film's internal cells are filled with gas, which cells, even if evacuated, would leave the remaining dielectric structure with many internal paths for heat loss. Also, Kirjavainen does not describe any method for maintaining a 1 kV voltage without an external supply. Without such a continuous supply, such an applied DC voltage would quickly dissipate through exposure of the external electrodes to electric charges in air.

In summary, prior-art electrostatic films have not been useful in evacuated panels, having no provision for maintaining a vacuum and no provision for maintaining an electric charge without an external supply.

OBJECTS AND ADVANTAGES

Accordingly, several objects and advantages of the present invention are:
(a) To provide an improved evacuated insulating sheet or panel structure that eliminates heat loss due to heat conduction in internal spacers, greatly improving the insulating performance.
(b) To provide an improved evacuated insulating sheet or panel structure that is non-magnetic, and that does not loose its effectiveness at high temperatures.
(c) To provide an improved evacuated insulating sheet or panel structure that is very light in weight.
(d) To provide an improved evacuated insulating sheet or panel structure that is relatively thin and therefore useful in many applications requiring a thin insulator, which applications are not now possible with a high-performance evacuated insulating panel.
(e) To provide a thin evacuated sheet or panel structure that may be bent sharply without loosing its insulating ability, and which may be easily flexed during application or use.
(f) To provide an improved evacuated insulating sheet or panel structure that uses electrostatic forces to resist collapse, thereby to establish and maintain a vacuum space and an electric charge without an external power supply.

A further object is to provide a sheet or panel structure with very low thermal and electrical conductivity, low weight, and reduced thickness compared to any prior non-evacuated insulating layer.

The above and still further objects and advantages will become apparent from a consideration of the ensuing description and drawings.

REFERENCE NUMERALS IN DRAWINGS 12 first external protective layer
14 first impermeable and electrostatic compensation layer
16 first electric insulating layer
18 first electrostatic repulsion layer
20 evacuated space
22 second external protective layer
24 second impermeable and electrostatic compensation layer
26 second electric insulating layer
28 second electrostatic repulsion layer
30 effective voltage source
32 electric field lines
40 load tapes
42 load ring
44 load guys
46 payload
50 external walls of refrigerator
52 internal walls of refrigerator
54 folds in electrostatic evacuated insulating sheet
56 conventional refrigerator insulation

Figure 1:
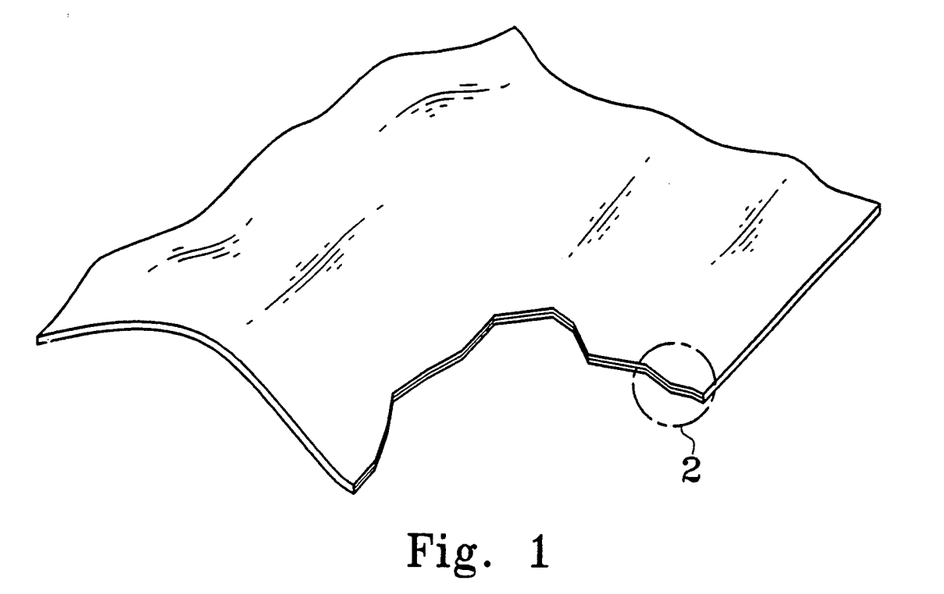
FIG. 1 shows a perspective view of an electrostatic evacuated insulating sheet in accordance with my invention, with the front corner cut away to show the interior.
Figure 2:
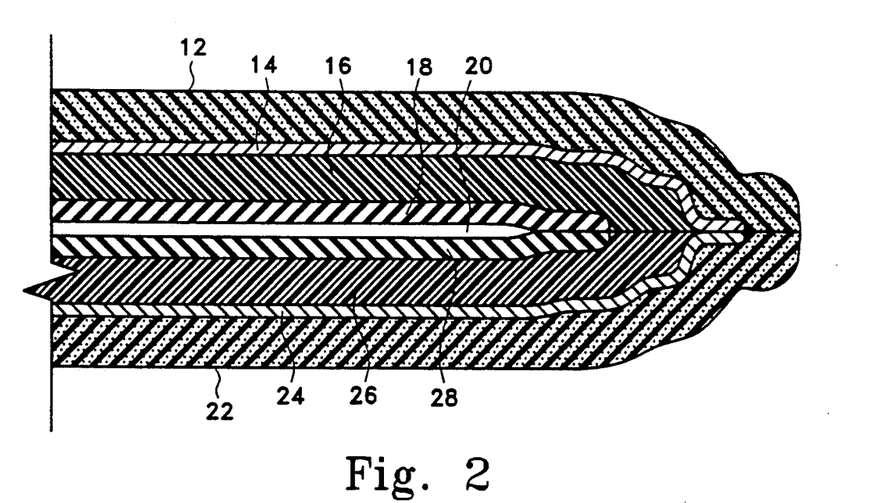
FIG. 2 shows an enlarged cross-sectional view of the sheet of FIG. 1, showing the interior in more distinct detail.

DESCRIPTION—FIGS. 1 AND 2—ELECTROSTATIC EVACUATED INSULATING SHEET

A preferred embodiment of the electrostatic evacuated insulating sheet or panel structure is illustrated in FIG. 1, a perspective view, and in FIG. 2, an enlarged cross-sectional view of FIG. 1. The sheet (FIG. 2) comprises top and bottom multilayer laminates. The top multilayer laminate comprises a first external protective layer 12, below which is laminated a first impermeable and electrostatic compensation layer 14. A first electric insulating layer 16 is laminated below layer 14. Below layer 16 a first electrostatic repulsion layer 18 is laminated to complete the top laminate.

The bottom multilayer laminate is a mirror image of the top multilayer laminate and comprises a second external protective layer 22, above which is laminated a second impermeable and electrostatic compensation layer 24. A second electric insulating layer 26 is laminated above layer 24 and a second electrostatic repulsion layer 28 is laminated above layer 26.

The top multilayer laminate (layers 12, 14, 16, and 18) is joined to the bottom multilayer laminate (layers 22, 24, 26, and 28) around the perimeter of the sheet, as shown in FIG. 2. Protective layers 12 and 22 butt together and overlap at their edges and are joined by any suitable mechanical or adhesive means, to be described infra. Compensation layers 14 and 24 butt together and overlap at their edges and are joined by any suitable gas-tight sealing means, to be describe infra. Insulating layers 16 and 26 butt together at their edges. Repulsion layers 18 and 28 meet and overlap at their edges, but are otherwise separated from each other by a small gap, thereby to provide an interior evacuated cavity or space 20.

DIMENSIONS

The sheet can have any suitable length and width. Its thickness is preferably small, typically from 1.20 millimeters (mm) to 2.90 mm. The thickness of protective layers 12 and 22 is typically from 0.50 mm to 1.00 mm, and is shown greatly reduced for illustration purposes in FIG. 2. The thickness of compensation layers 14 and 24 is typically 0.05 mm to 0.20 mm, and is minimized consistent with long-term maintenance of the vacuum as described subsequently. The thickness of insulating layers 16 and 26 is typically 0.05 mm to 0.20 mm, and is minimized consistent with maintenance of the electrostatic charge as also described below. The thickness of repulsion layers 18 and 28 is typically small, 5 to 30 micrometers (microns), and is shown greatly enlarged for illustration purposes in FIG. 2. The thicknesses of layers 18 and 28 is minimized consistent with those layer's ability to take and hold an electrostatic charge force, as additionally described infra. The thickness of space 20 is typically small, 1 to 20 microns, and is a function of the electric charge and external ambient pressure as further described below. The thickness of space 20 is shown greatly exaggerated in FIG. 2 for illustration purposes.

MATERIALS

Many materials are suitable for layers 12 and 22. These layers act as structural (shape providing and returning) members and also act to protect inner layers 14, 16, 18, 24, 26, and 28. This material will preferably have high strength and tear resistance, while also being flexible. It is also preferable that this material not allow the passage of environmental liquids, such as water, to the interior layers. Such materials may preferably include polymers, which polymers include polyolefins, such as polyethylene and polypropylene, polyethylene terephthalate (PET), polyesters, such as polybutylene terephthalate, polyamides, such as nylon 6 (polycaprolactam) and nylon 66 (polyhexamethylene adipate), and fluoropolymers, such as polyfluoroethylenepropylene (FEP) and polytetrafluoroethylene (PTFE). Such materials may also include elastomers (rubbers or latex), which elastomers include butadiene rubber, butyl rubber, nitrile-butadiene rubber, and silicones (polydimethylsiloxane). Separate strength members, such as fibers and woven materials, can be placed in layers 12 and 22 for improved ability to support stretching and tearing loads. Non-flexible materials, such as glasses and ceramics, may be selected for applications in temperatures exceeding that allowable with polymer and elastomer materials.

Typically, impermeable and electrostatic compensation layers 14 and 24 will be metal sheets. Layers 14 and 24 act to block the passage of gases to evacuated interior space 20. Without an impermeable layer, passage of gases from the exterior would eliminate the internal high vacuum and cause the insulation to become ineffective. According to *Ultrahigh Vacuum Practice* by George Frederick Weston (Butterworth & Co. Ltd. 1985) the quantity of gas passing through a solid wall is proportional to a "permeation constant" and inversely proportional to the thickness of the wall. The permeation constant varies with temperature, the particular gas, and the material of the wall. Only metals combine low impermeability with flexibility. Generally only gases that are soluble in the metal will permeate through it. These gases are hydrogen and oxygen in most metals, and water vapor in mild steel. Layers 14 and 24 also act as electrostatic compensation layers, which function is described subsequently. Preferably, these compensation layers are electric conductors. Therefore, typical materials for layers 14 and 24 are aluminum, copper, or stainless steel, or their alloys with other metals. Layers 14 and 24 can optionally comprise multiple impermeable sheets of metal alternating with interlayers of flexible material, such as a polymer. Such an optional multiple impermeable sheet construction can give high total impermeability while limiting the thickness of any single metal sheet, thus reducing the possibility and adverse affect of cracking failures in any single metal sheet when subject to bending.

Several materials are suitable for electric insulating layers 16 and 26. Layers 16 and 26 act to block the passage of charge carriers between layers 14 and 24 to layers 18 and 28 respectively, as described subsequently. Preferred materials for layers 16 and 26 will have a very high electrical resistance, typically having a volume resistivity of $10^{16}$ to $10^{20}$ Ohm-cm, and include all materials listed for layers 12 and 22 previously. Again, non-flexible materials, such as glasses and ceramics, can be selected for applications in temperatures exceeding that allowable with polymer and elastomer materials.

Several materials are suitable for electrostatic repulsion layers 18 and 28. Repulsion layers 18 and 28 hold electric charges of the same electric polarity. Preferred materials for repulsion layers 18 and 28 are electrets, defined as electrically insulating materials able to retain introduced monopolar electric charges for extended periods of time. Such materials, as described in U.S. Pat. No. 4,527,218 (1985) to von Seggern, include fluoropolymers, such as FEP and PTFE, sold under the trademark Teflon of E. I. Dupont de Nemours and Company. Other polymer electret materials include polycarbonate (PC), polyimide (PI), polyethylene, polypropylene and polyethylene terephthalate (PETP) as described in U.S. Pat. No. 4,390,800 (1983) to Tanaka et al. and in U.S. Pat. No. 4,626,263 (1986) to Inoue et al. Certain inorganic materials are good electrets, such as silicon dioxide (as described by Sessler, G. M. "Charge Storage in Dielectrics," *Proceedings of the 6th International Symposium on Electrets*, Oxford, England 1988, pp. 37-45) and aluminum oxide, but would generally only be useful when flexibility is not required. The electrets are charged, as described infra. Non-electret materials, such as metals, can also be used for repulsion layers 18 and 28, but being electric conductors, electric charges on metals move to the surface, which may limit the maximum charge obtainable. Both inorganic electrets and metallic non-electrets can be selected for applications in temperatures exceeding that allowable with polymer and elastomer materials.

The material selected for layers 18 and 28 must be made very smooth on the layer surfaces facing space 20. That is because the gap between the layers, as described earlier, is quite small (1 to 20 microns). Any surface imperfections larger than that distance will cause the layers to touch, defeating the vacuum insulation at that point. Techniques for producing such surface smoothness are well within the current state of the art for polymer sheets, glasses, ceramics, and metals.

CHARGING OF ELECTRETS

Repulsion layers 18 and 28 must be charged with a sufficient density of electric charges to repel the two layers away from each other against ambient pressure. For atmospheric pressure, that required charge density is approximately 1.33 milliCoulomb per meter squared ($mC/m^2$), as described subsequently. There are many methods in common use for introducing charges into electret material. These include contacting the electret material with an electrically charged, wet electrode, exposing it to a corona discharge, and ion implantation. References for such methods are Tanaka et al., von Seggern, and Inoue et al., op. cit. Bozena Hilczer and Jerzy Malecki (Hilczer) in *Electrets* (Elsevier Science Publishing Co. 1986) describe the method of implanting ions (electrons) in detail. The required charge density exceeds that customarily used in commercial electret applications by about a factor of ten. Yet, Inoue et al. teach methods and materials for producing charged electrets having surface charge densities up to 1 $mC/m^2$. Tanaka et al. teach methods to build up very large surface charges by stacking a plurality of electret elements. These methods of producing higher surface charge densities generally require thicker electrets than the 12.5 to 25 micron thick samples most often used commercially in microphones. Another reference, *Electrets*, vol. 33 of *Topics in Applied Physics*, G. M. Sessler, ed. (1980), reports real charge densities of up to 5 $mC/m^2$.

Charging of electret material for repulsion layers 18 and 28 may be effected to either a uniform density across the surface or a non-uniform density. Typically, mono-polar negative charges (electrons) will be introduced into the electret material. However, the introduced charges may also be monopolar positive charges. Typically, charges will be introduced in a homogeneous density across the electret surface which, as noted by Hilczer, op. cit. can be obtained by either contact with a charged liquid or by ion implantation. Charge type (negative or positive), density, and charge depth may be varied across the entire area of repulsion layers 18 and 28. By such methods, it is possible to provide differing properties of normal force as a function of gap thickness and to provide forces in the plane of repulsion layers 18 and 28 to resist shear displacement.

The first three layers of the top multilayer laminate (layers 14, 16, and 18) are typically laminated from initially separate rolls by either adhesive or heat bonding. Such methods are described by J. H. Briston in *Plastics Films*, 3rd Ed. (John Wiley & Sons 1988). Heat bonding can be used when the material for layer 16 is a thermoplastic, which is then brought to a suitable near-melting temperature on both surfaces and run through a pressure roller with layers 14 and 18 on either side. Adhesive dry bonding can be used when layer 16 is not a thermoplastic, in which case adhesive is applied to both sides of layer 16, dried, and then run through a pressure roller with layers 14 and 16. Layer 14 can alternatively be first laminated to layer 16 by any of the standard metal-to-film application methods (evaporation, ion plating, electron beam deposition, electroplating, and sputtering) described in *Metallized Plastics* 1 by K. L. Mittal and J. R. Susko (Plenum Press 1988). A second lamination, of layer 18 to that laminate of layers 14 and 16, can then be performed using heat or adhesive bonding. Alternatively to each of the above methods, layers 14, 16, and 18 can be laminated simply by bringing them together, which laminate is held together as electrostatic forces are established, as described in the next paragraph.

The laminated layers 14, 16, and 18 are then typically heated or placed in a vacuum, or both, to drive gasses out from the material of the layers and adhesives. Such outgassing typically removes water vapor. After outgassing, the roll of laminated layers 14, 16, and 18 is brought into a vacuum chamber and layer 18 is electrically charged. When layer is is an electret, charging is done as described by Hilczer, op. cit. where an electron beam of defined voltage (typically 10 to 50 kV) and current is directed at layer 18. Typically, compensation layer 14 is grounded to attract the electron beam. As layer 18 is charged, layer 14 attracts a compensation charge immediately through the ground connection, and thus secondary emission of introduced charges from layer 18 is greatly reduced. Layers 18 and 14 will now also very strongly attract each other with electrostatic forces of the same magnitude as act to force the top and bottom multilayer laminates apart, as described subsequently. With such attraction holding layer 16 strongly between layers 18 and 14, these three layers become a laminate, even if heat or adhesive bonding is not used.

CONSTRUCTION

The first three layers of the bottom multilayer laminate (layers 24, 26, and 28) are laminated in the same manner as the first three layers of the top multilayer laminate, as described above. Once charging is complete, the top and bottom multilayer laminates are brought together inside the vacuum chamber and the edges of impermeable layers 14 and 24 are sealed together. Again sealing can be effected either by adhesive or heat bonding. The resulting sheet, having a top multilayer laminate (layers 14, 16, and 18) and a bottom multilayer laminate (layers 24, 26, and 28), is wound tightly on a take-up roller. At the beginning of that take-up roll and when the roll is complete, and optionally at selected intervals in between, the top and bottom multilayer laminates are sealed (using either adhesive or heat bonding) in a line orthogonal to the edge of the roll. Performing the sealing operation creates space 20, which space is then already evacuated of air. Sealing to make space 20 while the laminates are in the vacuum charging chamber prevents layers 18 and 28 from picking up compensation charges from the atmosphere, which would occur if these layers were exposed to air.

The sealed top and bottom multilayer laminates, on a take up roll, are then removed from the vacuum chamber, unrolled and external layers 12 and 22 are applied. Typically, layers 12 and 22 are applied by extrusion coating when these layers are composed of a suitable thermoplastic polymer, such as polyethylene. Other materials for layers 12 and 22 can be bonded by adhesives, heating, and pressure. Layers 12 and 22 can also be laminated to the top and bottom multilayer laminates before charging of the electret.

Figure 3:
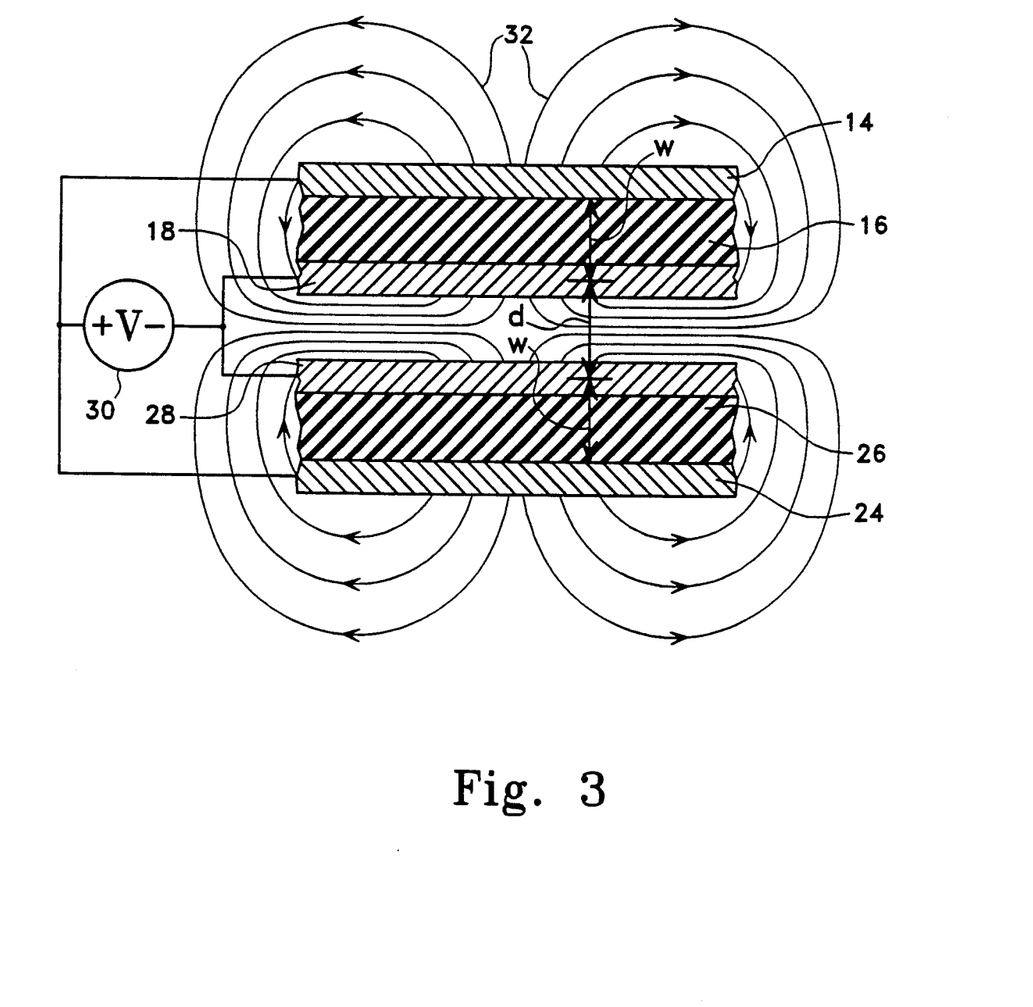
FIG. 3 shows a cross-sectional schematic view illustrating the theory of operation of my electrostatic evacuated insulating sheet or panel.

OPERATION—FIGS. 1, 2, AND 3—ELECTROSTATIC EVACUATED INSULATING SHEET

When two electric charges Q and q of the same polarity are placed in proximity, they exhibit a mutually repulsive force described by Coulomb's Law according to the following equation.

$$f = \frac{1}{4\pi\epsilon\epsilon_0} \cdot \frac{Qq}{r^2}$$

$$\epsilon_0 = 8.854 \cdot 10^{-12}$$
$$\epsilon = 1 \text{ For vacuum.}$$

The force, f (Newtons), is directly proportional to the product of the two charges, Q and q (Coulombs), and inversely proportional to the square of the distance between them, r (meters).

FIG. 3 is a cross-sectional schematic view illustrating the theory of operation of the electrostatic sheet of FIGS. 1 and 2. The sheet uses Coulomb forces to generate a repulsive force between the top and bottom layers. Repulsive layers 18 and 28 are given monopolar charges, as described earlier, placing them at the same electric potential. Compensation layers 14 and 24 get opposite charges, as described subsequently, placing an effective voltage 30 Volts (V) on the system. Ignoring, for now, the charges on compensating layers 14 and 24, Coulomb's Law may be solved for parallel sheet layers 18 and 28 which are a distance d apart (between layer charge centroids, as explained subsequently). The repelling force per unit area, F/A Newtons per meter squared (N/m$^2$) is:

$$\frac{F}{A} = \frac{V^2\epsilon_0\epsilon}{2d^2}$$

This is the same equation derived by Kirjavainen, op. cit. for the attractive force between two close parallel sheet electrodes charged oppositely, separated by a dielectric. The equation is the same for repulsive (like charges on each plane) and attractive (unlike charges on each plane) forces because only the direction of the force changes with the sign of the electric charge. It should also be mentioned that this equation gives a greater F/A at the sheet edges than does an exact solution. However, this equation is nearly exact for any distances in from the edge exceeding about ten times the plane's separation. For plane separations, or gaps, of 1 to 20 microns this equation then adequately describes forces 0.20 mm from the edge. As shown by FIGS. 1 and 2, the overlap of repulsion layers 18 and 28 can be made to exceed 0.20 mm, so this equation pertains.

If the repelling force of two parallel sheet layers is equal to or greater than the ambient pressure, it is possible to maintain a vacuum between the two layers without any intervening structure. When this equation is solved for atmospheric pressure of approximately 100,000 Newtons/square meter at sea level, and the surface voltage V is 2000 V (a normal high maximum for existing commercial electrets), then the resulting distance between layers d is 13 microns. This distance, while small, is still sufficient to provide the benefits of vacuum insulation. This is because a vacuum gap stops all conductive and convective heat transfer, no matter how small it is. Distance d is a function of the ambient pressure F/A, and will vary a slight amount if ambient pressure varies. That distance variance is very slight, however, since the force is a function of d$^2$. Also, that same function determines that the distance is a stable function of F/A, meaning that the sheet configuration will maintain itself even under variations of ambient pressure and variations in local surface voltage.

Distance d between layers 18 and 28 as shown in FIG. 3, and as used in the F/A equation, is not equal to the distance between the space-facing surfaces of layers 18 and 28 as shown in FIGS. 1 and 2. Distance d should rather be taken as the distance between the centroid of charge density in each repulsion layer 18 and 28 According to Hilczer and Sessler, op. cit. the charge distribution with depth is, with ion implantation, generally a bell-shaped curve around a mean depth determined by the ion acceleration voltage. Typically, to arrive at the necessary charge density and avoid internal breakdown, charges will be implanted at several depths. To an approximation, the resulting charge centroid is the middle of each layer 18 and 28 for electrets charged to a uniform charge density. If repulsion layers 18 and 28 are each then 12 microns (0.5 mil) thick, a standard electret thickness in microphones, then distance d of 13 microns gives an actual gap thickness of only 1 micron. While still sufficient for vacuum insulation, that gap is very small and illustrates the advantage of obtaining as high a charge density as possible in repulsion layers 18 and 28, which layers are made as thin as possible to hold that charge. Lower charge densities can still be useful in applications, such as at high altitude, where atmospheric pressure is less than 100,000 N/m$^2$. Alternatively, using charged metal sheets for repulsion layers 18 and 28 may allow much thinner layers, although the charges would migrate to the side of layers 18 and 28 nearest insulating layers 16 and 26, and distance d must be adjusted to allow for two thicknesses of the metallic sheets.

EFFECTS OF COMPENSATION CHARGES

Unfortunately it is not possible to maintain a monopolar charge on a layer without attracting "compensating" charges of the opposite polarity from the atmosphere. As shown in FIGS. 1, 2, and 3, compensation layers 14 and 24 are established outside of repulsion layers 18 and 28, separated from those layers by electric insulating layers 16 and 26, respectively. The purpose of compensation layers 14 and 24 is to hold a charge of opposite sign to the charge of repulsion layers 18 and 28. The net charge of the sheet is then zero and it will not attract further charges from the atmosphere.

FIG. 3 shows the effects of the compensating charges. A static electric field 32 will be established between repulsion layers 18 and 28 and compensation layers 14 and 24, respectively. The compensating charges will act to diminish the repelling forces between layers 18 and 28. This diminishment can be calculated by adding the forces between layers 18 and 28, adding the forces between layers 14 and 24, subtracting the forces between layers 18 and 24, and subtracting the forces between layers 28 and 14. For these calculations a conservative, and simplifying, assumption is that the relative permittivity inside insulating layers 16 and 26 is one. Also, note that FIG. 3 shows distances d and w to the middle of layers 18 and 28, the charges being evenly distributed in those electret layers, and distances to the nearest edge of layers 14 and 24, the charges gathering at the surface of those metallic layers. When these calculations are done, a new effective distance $d_{eff}$ between the sheets can be defined that is a function of the distance d and the thickness of insulating layers 16 and 26, w:

$$d_{eff} = \sqrt{\frac{1}{\frac{1}{(d+2w)^2} - \frac{2}{(d+w)^2} + \frac{1}{d^2}}}$$

When the ratio of w to d exceeds ten, the effective distance, $d_{eff}$, becomes within one percent of actual distance d. Therefore, since in almost all actual cases the insulating layer's thickness will exceed the distance by ten, we can ignore the effects of the compensating charges on distance d.

CHARGE DENSITY

There are some important considerations in the use of monopolarly charged electrets for evacuated sheet or panel structure insulation. One has already been mentioned, the effective limit on the density of charges that can be achieved in practice in an electret Here the operative equations are, as found in the text *Basic Electric Power Engineering*, by O. I. Elgerd, Addison-Wesley 1977:

$$V = \frac{\rho_s d}{\epsilon \epsilon_0}$$

$$\frac{F}{A} = \frac{\rho_s^2}{2\epsilon \epsilon_0}$$

The calculated surface charge density, $\rho_s$, is thereby a function of either the desired surface voltage, V, or the desired force per unit area, F/A. If the force per unit area is set to 100,000 Newtons per square meter for atmospheric pressure, then the calculated surface charge density is 1.33 mC/m². This charge density is well within that attained in prior art electrets. Hilczer, op. cit. notes that charge density is limited by two effects in electrets: internal breakdown due to an excessive electric field in the electret layer and escape of electrons (cathodic emission) from the surface. Internal breakdown can be eliminated by charging the electrets with ions (generally electrons) at selected depths by controlling the acceleration voltage in the ion implantation process, as typically used to charge the electret layers. Cathodic emission is eliminated since both layers 18 and 28 are at the same potential; charges in those layers are attracted only to the compensation layers 14 and 24 respectively.

The strong electric fields between repulsion layers 18 and 28 and their respective compensation layers 14 and 24 do not exceed the dielectric breakdown strength of their respective insulation layers 16 and 26. The calculated electric field strength inside insulation layers 16 and 26 is 72 megaVolts per meter (MV/m), when F/A is 100,000 N/m² and the relative permittivity inside the dielectric is 2.1 (as for PTFE). That field strength level is well within the dielectric breakdown limit of 100 MV/m per meter obtainable in plastic films according to Kirjavainen, op. cit. Dielectric breakdown is over 300 MV/m in silicon dioxide films.

TEMPERATURE RANGE AND FLEXIBILITY

The materials selected for layers 12, 14, 16, 18, 22, 24, 26, and 28 will determine a useful temperature range for the sheet as an insulator. If the sheet is intended for flexible use, generally polymers and rubbers will be used, with a useful temperature range of about −100 to 100 degrees Centigrade. Further, if polymers are used for repulsion sheets 18 and 28, and those sheets are electrets, then there is generally a "half life" of charge density that decreases markedly with increasing temperatures above approximately 100 degrees Centigrade. (See Hilczer and Sessler, op. cit.) Charges might then dissipate in a few hours. On the other hand, charge densities in polymer electrets become much more stable at lower temperatures. Charge density half lives may be ten to one hundred years in such circumstances. Use of very high resistance materials for layers 16 and 26, and the fact that layers 18 and 28 are not exposed to air, may greatly extend the usual useful lifetime expected for permanently charged electrets. The use of metallic sheets for repulsion layers 18 and 28 enables these sheets to be recharged by means of temporarily or permanently attaching an external power supply.

The sheet may be bent sharply in use, such as by attachment to a curved surface to be insulated. The sheet may also be flexed after attachment, such as when applied around a hinged member to be insulated. Since repulsion layers 18 and 28 are not attached to each other, except at the edges of the sheet, bending the sheet will give a shear force between layers 18 and 28 that will cause them to slide with respect to each other. Such bending will then be possible to the degree that layers 12, 14, 16, and 18 in the top and layers 22, 24, 26, and 28 in the bottom can bend. Appropriate selection of flexible materials for those layers, as previous mentioned, should allow bending radii of about four times the thickness of those layers. That would then allow a bending radius for the sheet of about 5 to 10 mm without causing the layers to contact.

VACUUM MAINTENANCE AND THERMAL CONDUCTIVITY

The sheet becomes an insulator as air is evacuated to a high vacuum in space 20. As described earlier, preferably the sheet is assembled in a vacuum, its edges are sealed, and then it is removed into air. Alternatively, the vacuum may be established by connecting a vacuum pump to space 20 with an airtight connection, as in a threaded valve, and then running the pump until the high vacuum is achieved. If leakage of exterior gases into space 20 occurs over time, the user can periodically reattach and use a vacuum pump. Alternatively, a vacuum pump may be permanently attached and run periodically or upon control of a gas sensor.

The thermal conductivity of the sheet is determined by three factors: the conduction at the edges, the slight conduction through any remaining gas in space 20, and heat radiation through space 20. Rathmell, supra states that such thermal conductivity in an evacuated panel may be approximated by that obtained in a common vacuum bottle, which he equates to 17 cm (6.67 inches) of polystyrene foam.

Figure 4:
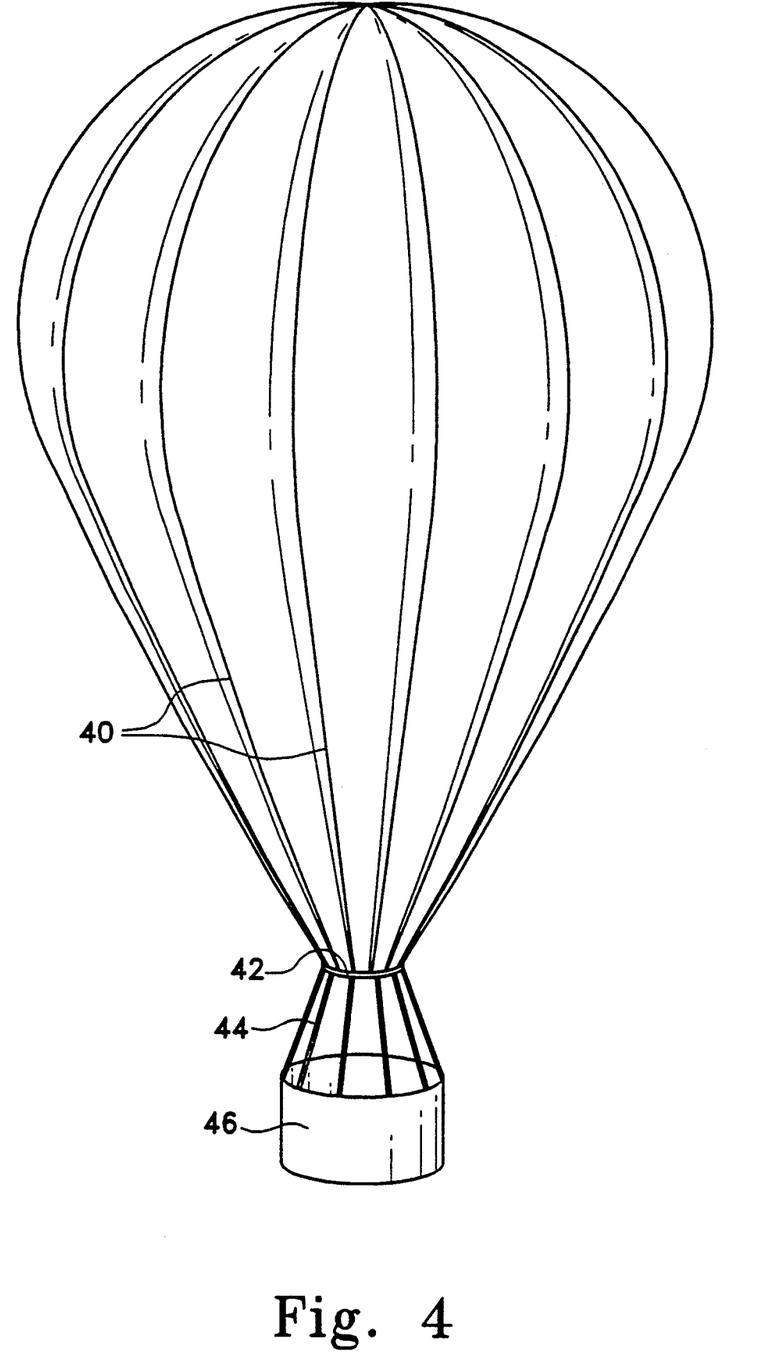
FIG. 4 shows a side view of a lighter-than-air balloon having an envelope of an electrostatic evacuated insulating sheet.

DESCRIPTION—FIG. 4—LIGHTER-THAN-AIR BALLOON USING AN ELECTROSTATIC EVACUATED INSULATING SHEET AS THE ENVELOPE

A typical application of an electrostatic evacuated insulating sheet is as an envelope for a lighter-than-air craft, as illustrated in FIG. 4, a side view of a balloon. The sheet forms the entire gas enclosing envelope for the balloon. Loads are transferred from that envelope by a set of load tapes 40 attached to the inside-facing sides of the sheet, so that all additional loads on the sheet are in tension. It is important to avoid additional compressive loads across the sheet to avoid defeating the vacuum insulation at that point. Loads are then transferred from tapes 40 to a load ring 42. Load ring 42 supports a set of load guys 44 that then attach to a payload 46, such as weather instruments.

The balloon envelope is filled with a lighter-than-air gas, preferably a mixture of water vapor and hydrogen gas at higher than ambient temperature. As stated in *Your Next Fifty Years* by R. W. Prehoda, (Ace Books 1980) on p. 268, a mixture of 27 percent steam (water vapor) and 73 percent hydrogen renders the hydrogen inflammable. Water vapor is, itself, a lighter-than-air gas in the ratio of atomic weight of approximately 18 parts to 28 parts of air. Therefore, hydrogen gas can be eliminated entirely, and the balloon can be filled with water vapor at a temperature of 100 degrees Centigrade at sea level. Lower temperatures would maintain the water in a vapor state at the lower pressures present at altitude. Such a water vapor (steam) balloon would require a larger envelope, for the same payload weight, compared to a mixed water vapor/hydrogen gas-filled balloon. Air at elevated temperature can also serve as the lift gas. A hot-air filled balloon requires a yet larger envelope compared to water/hydrogen or water vapor gas-filled balloons. All of these typical gases need to be maintained at a higher temperature than the surrounding ambient air. Use of the electrostatic evacuated insulating envelope allows such a temperature difference at a very low loss of heat, requiring little external energy to maintain the needed temperature difference.

The balloon of FIG. 4 has extended flight duration times, typically 10 to 100 days, which is much greater than present hot-air balloons. Present hot-air balloons loose prodigious amounts of energy through their non-insulating envelopes, requiring constant addition of energy by burning fuel; when the fuel runs out that balloon must land. Typically, the loss of heat through the envelope of the balloon of FIG. 4 is one-tenth to one-hundredth that of present envelopes, giving correspondingly longer flight duration times for the same amount of fuel.

The balloon of FIG. 4 has much lower operating expenses than present helium balloons. Helium gas is used in present balloons, over inexpensive hydrogen, because it is non-flammable. However, helium is much more expensive than hydrogen gas, and must constantly be added to conventional balloons as it is lost by permeation through their envelopes. Typically, the lift gas for the balloon of FIG. 4 is a non-flammable mixture of hydrogen and water vapor held at an elevated to ambient temperature, having a weight per volume little more than that of helium. The balloon of FIG. 4 may therefore have the same high lift and small envelope size as conventional helium-filled balloons, while using inexpensive lift gases.

Figure 5:
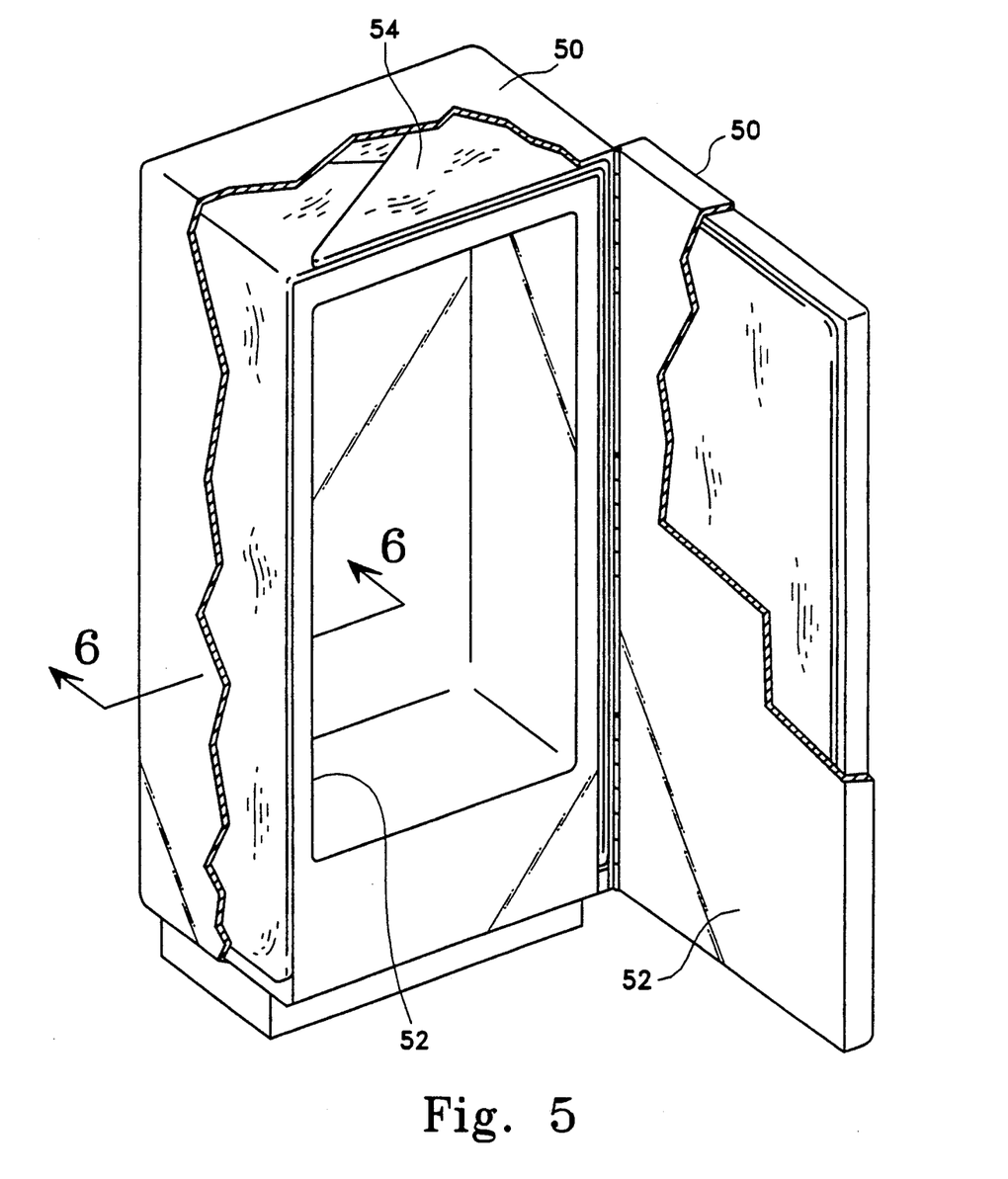
FIG. 5 shows a perspective view of a refrigerator with walls insulated by an electrostatic evacuated insulating sheet.

DESCRIPTION—FIG. 5—REFRIGERATOR

Figure 6:
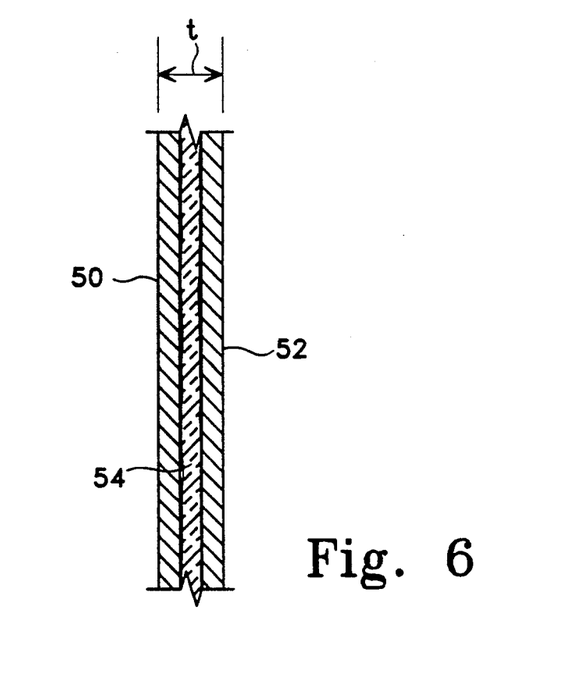
FIG. 6 shows a cross-sectional view of the wall of the refrigerator of FIG. 5, as taken along line 6—6.

Another typical application of an electrostatic evacuated insulating sheet is for insulating the walls of a refrigerator, as illustrated in FIG. 5, a perspective view. FIG. 6, a cross-sectional view of FIG. 5 as taken along line 6—6, shows the wall in more detail. The refrigerator has an external wall 50 and an internal wall 52, between which is disposed the insulating sheet for insulation. The sheet cannot be cut without opening space 20 to air. So, the sheet is folded from the back of the refrigerator with 90 degree angles to the top, bottom, and sides of walls 52. To conform to the required space, the sheet is arranged with a folding pattern 54 at both the top and the bottom of the refrigerator. As previously described, the sheet can be folded very sharply without compromising the vacuum insulation. Such folding will preferably be done over internal walls 52, with adhesives holding the sheet on walls 52, before slipping that assembly inside external walls 50.

Figure 7:
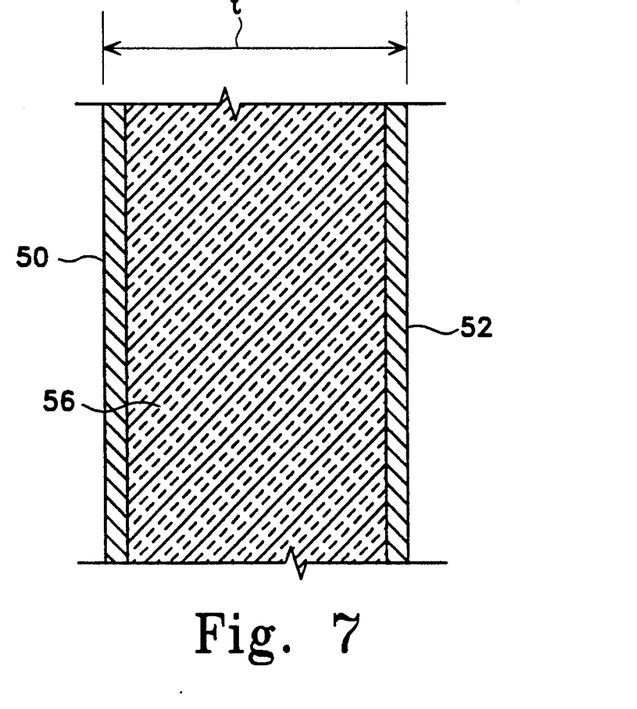
FIG. 7 shows a cross-sectional view of the wall of a refrigerator using conventional insulation.

The spacing between external walls 50 and internal walls 52 may be made very small, under 2 mm as previously described for the thickness of the sheet. The resulting refrigerator total wall thickness t is under 5 mm, with a typical thickness of external wall 50 of 1 mm and of internal wall 52 of 2 mm. FIG. 7 shows a typical wall cross section for a conventional refrigerator. The conventional foamed plastic insulating layer 56 is typically 25 to 50 mm thick, giving a refrigerator wall thickness t of 28 to 53 mm. Thus, by using the insulating sheet, refrigerator wall thickness t may be reduced by typically between 23 to 48 mm. For a typical refrigerator of external dimensions 80 centimeter (cm) wide by 165 cm high (allowing 20 cm for compressor and evaporator) by 70 cm deep, interior space may be increased by between 17 and 42 percent, without changing external dimensions. Alternatively, the external dimensions of the refrigerator can be reduced by between 4.6 and 9.6 cm in width, height, and depth, without changing the usable interior volume.

The evacuated insulating sheet will greatly improve the insulating performance compared to conventional plastic foam insulators, as mentioned previously. The refrigerator's energy use can be greatly reduced, which energy cost now substantially exceeds the cost of the refrigerator over its lifetime. With such reduced energy use, the refrigerator's cooling means, generally an electrically powered compressor and fan, may also be reduced in size and cost. As mentioned previously, a vacuum pump may be attached to space 20 to maintain the high vacuum necessary for continued insulating effectiveness. Such a pump could be very small in size, and run only intermittently, and thus would add very little to the cost, size, or energy use of the refrigerator.

SUMMARY, RAMIFICATIONS, AND SCOPE

Accordingly, the reader will see that my electrostatic evacuated insulating sheet or panel structure has the following advantages over prior evacuated insulating panels:

it provides an improved evacuated insulating sheet or panel structure that eliminates internal spacers and the heat loss through them, greatly improving the insulating performance.

it eliminates the internal spacers without using magnets, and is not limited to applications at temperatures below the Curie point.

it provides an evacuated insulating sheet or panel structure that is very light in weight and useful in applications requiring light weight and portability. One such application is in a lighter-than-air balloon that may usefully use evacuated insulation for the first time to maintain lift gas at an elevated temperature at low energy expenditure.

it provides an evacuated sheet or panel structure that is very thin and allows use in any application requiring a thin insulator. One such application is in a refrigerator, where wall thickness may be reduced, greatly increasing useful interior space. Alternatively, the same useful interior space of a conventionally insulated refrigerator may be obtained with much smaller exterior dimensions. Energy expenditures are greatly reduced over conventional refrigerators due to the use of a high performance evacuated insulator. Such reduced energy expenditures allow smaller motors and compressors to be used.

it may be bent sharply and easily flexed during application or use, opening up many application areas to evacuated insulation for the first time. One such application is in a refrigerator, where a single electrostatic evacuated sheet can easily be formed during refrigerator fabrication to follow the sharp contours and angles of the required space, eliminating the need to design, construct, and stock multiple custom insulation configurations.

it uses electrostatic forces for the first time in evacuated insulation, providing for the establishment and maintenance of a vacuum, also providing for the maintenance of the required electric charge without permanent attachment of an external power supply.

Although the above description contains many specificities, these should not be construed as limiting the scope of the invention, but as merely providing illustrations of some of the presently preferred embodiments of this invention. Many other variations are possible. For example, several different edge seals are possible; many different materials and combinations of materials may be used, such as silicon dioxide for the electric insulator layer or electret layer, or in use of any newly-developed material for the impermeable, electric insulating, or electret layers; many different arrangements of the sheet or panel structure are possible, such as by forming patterns of many separate evacuated spaces (to limit insulation loss if gas enters any given space) and such as stacking in multiple layers to give higher resistance to heat transfer by radiation; provision may be made for addition of highly reflective surfaces to reduce radiation transmission of heat; provision may be made to attach, temporarily or permanently, a vacuum pump to maintain a good vacuum; provision may be made to attach, temporarily or permanently, a voltage supply to maintain a voltage on the electrostatic repulsion layer; etc.

Thus the scope of the invention should be determined by the appended claims and their legal equivalents, rather than by the examples given.

I claim:

1. A lightweight evacuated thermal insulating structure, comprising:
   two impermeable multilayered sheets, each of said sheet comprising an electrical compensation layer, an electrical insulation layer and an electrostatic force repulsive layer, said two impermeable sheets being arranged in a generally parallel, spaced relationship, said impermeable sheets having an evacuated space therebetween, the edges of said sheets being substantially sealed, said electrostatic force repulsive layers are changed with monopolar electrostatic charges said electrostatic charges being arranged so that each provides the same polarity of force facing into said evacuated space so that said same polarity of forces repel each other to force and maintain said impermeable sheets spaced apart,
   said electrostatic charges being of sufficient magnitude so as to resist ambient pressure acting to collapse said evacuated space and thereby maintain the separation between said impermeable sheets.

2. An evacuated structure as in claim 1 wherein said compensation layers are metallic sheets able to conduct electricity, so that said compensation layers also act to hold electrostatic compensation charges.

3. An evacuated structure as in claim 2 wherein said repulsive layers are metallic sheets which are able to conduct electricity, said metallic sheets each having a monopolar charge having a charge density at least as great as the square root of the ambient pressure times twice the dielectric constant of a vacuum.

4. An evacuated structure as in claim 3 wherein said metallic repulsive layers have a thickness less than one half of the distance calculated by multiplying the voltage on said repulsion layers by the dielectric constant of vacuum divided by said charge density.

5. An evacuated structure as in claim 4, further including a pair of external protective layers laminated to said compensation layers, respectively.

6. An evacuated structure as in claim 2 wherein said repulsive layers are formed of electret material, said repulsive layers each having a monopolar charge having a charge density at least as great as the square root of the ambient pressure multiplied to twice the dielectric constant of vacuum.

7. An evacuated structure as in claim 6 wherein said electret repulsive layers have a thickness less than the distance calculated by multiplying the voltage on said repulsion layers by the dielectric constant of vacuum divided by said charge density.

8. An evacuated structure as in claim 7, further including a pair of external protective layers laminated to said compensation layers, respectively.

9. An evacuated structure as in claim 8 wherein said compensation layers, said electric insulating layers, said electret repulsive layers, and said protective layers are all flexible.

10. An evacuated structure as in claim 9 wherein said evacuated structure is formed into an envelope containing a lighter-than-air gas at greater than ambient temperature, and further including a plurality of load members attaching to said envelope, and further including a payload, said load members being also attached to said payload.

11. An evacuated structure as in claim 1, further including a refrigerator having external and internal walls, said evacuated structure being positioned between said external and internal walls, whereby said evacuated structure forms an insulation barrier for said refrigerator.

12. A lightweight, evacuated thermal insulating panel, comprising:
   two impermeable multilayered sheets, each of said sheet comprising an electrical compensation layer, an electrical insulation layer and an electrostatic force repulsive layer which will retain an electrostatic charge over an extended period of time, said repulsive layers being positioned in a generally parallel relationship with a space therebetween, said space having a thickness, as measured between and normal to said repulsion layers, which is smaller than the dimension of said space, as measured parallel to said layers, each of said repulsive layers having an extended area which is greater than its thickness and which is greater than said thickness of said space, the edges of said repulsive layers being joined so that said space therebetween is substantially sealed from the atmosphere surrounding said sheets, said space therebetween being substantially evacuated of air, each of said repulsive layers being electrostatically charged with like charges to at least a charge density calculated by taking the square root of two multiplied by the atmospheric pressure multiplied by the dielectric constant of vacuum, such that the thickness of said space therebetween is preserved despite said atmospheric pressure.

13. An evacuated structure as in claim 12, further including a plurality of external protective layers laminated to the exteriors of said compensation layers, respectively.

14. An evacuated structure as in claim 13 wherein said repulsive layers, said electric insulating layers, said compensation layers, and said protective layers are all flexible.

15. An evacuated structure as in claim 14 wherein said repulsive layers are formed of electret material.

16. An evacuated structure as in claim 15 wherein said repulsive layers have a thickness less than the distance calculated by multiplying the voltage on said repulsion layers by the dielectric constant of vacuum divided by said charge density.

17. An insulating panel as in claim 12, further including a refrigerator having external and internal walls, said insulating panel being positioned between said external and internal walls, whereby said insulating panel forms an insulation barrier for said refrigerator.

18. A lightweight evacuated thermal insulating structure, comprising:

two gas-impermeable multilayered sheets, each of said sheet comprising an electrical compensation layer, an electrical insulation layer and an electrostatic force repulsive layer, at least a portion of said electrostatic repulsive layers being spaced apart from each other by an evacuated space, said repulsive layers having smooth surfaces on boundaries of said evacuated space, the outer peripheral edges of said gas-impermeable layers being substantially sealed together;

said electrostatic repulsive layers being respectively charged with like polarity monopolar electrostatic charges, said electrostatic charges exerting a force on said electrostatic repulsive layers of sufficient magnitude to repel said electrostatic repulsive layers from each other and resist ambient atmospheric pressure tending to collapse said evacuated space, whereby said repulsive layers remain spaced apart.

19. The evacuated structure according to claim 18, wherein:

said gas-impermeable layers are sealed together by an adhesive sealant.

20. An evacuated structure according to claim 18, wherein:

said gas-impermeable layers are sealed together by heat bonding.

21. A lightweight, evacuated thermal structure, comprising:

two impermeable multilayered sheets, each of said sheet comprising an electrical compensation layer, an electrical insulation layer and an electrostatic force repulsive layer, at least a portion of said electrostatic repulsive layers being spaced apart from each other by an evacuated space, the edges of said space being substantially sealed together, said layers having smooth surfaces on boundaries of said evacuated space; and means for charging said electrostatic repulsive layers with like polarity monopolar electrostatic charges;

said electrostatic charges, when applied to said electrostatic repulsive layers, exerting a force on said electrostatic repulsive layers of sufficient magnitude to repel said electrostatic repulsive layers from each other and resist ambient atmospheric pressure tending to collapse said evacuated space, whereby said repulsive layers remain spaced apart.

22. The structure according to claim 21, wherein:

said electrostatic repulsive layers are formed from a material that retains said electrostatic charges for a prolonged period of time.

23. The structure according to claim 22, wherein:

said material forming said electrostatic repulsive layers is an electret.

24. The structure according to claim 22, wherein:

said material forming said electrostatic repulsive layers is a metal.

* * * * *